United States Patent Office 2,853,476
Patented Sept. 23, 1958

2,853,476

REMOVAL OF OXYGEN FROM HYDROCARBON STREAMS

Thomas J. Kennedy and Raymond A. Tiede, Borger, Tex., assignors to Phillips Petroleum Company, a corporation of Delaware No Drawing. Application December 11, 1953
Serial No. 397,772

20 Claims. (Cl. 260—83.7)

This invention relates to the removal of oxygen from streams containing the same. In one aspect this invention relates to the removal of oxygen from hydrocarbon streams which may contain olefinic materials, for example, from a stream containing butadiene which is a readily reactable hydrocarbon. In another aspect this invention relates to a process for the removal of oxygen from a hydrocarbon stream by subjecting the same to an alkaline solution of an alkali metal hyposulfite. In still another aspect this invention relates to the polymerization of olefinic, and like materials, such as butadiene, to produce polymers having a correct Mooney viscosity, by pretreating the olefin feed to such a polymerization to remove oxygen therefrom. In still another aspect this invention relates to the simultaneous removal of oxygen and tertiary butylcatechol from an olefin stream by subjecting the same to an alkaline solution of an alkali metal hyposulfite.

In many instances the presence of dissolved oxygen in various reactable liquid streams to be used in manufacturing processes is deleterious. In some instances the oxygen acts as a catalyst poison. In some instances the oxygen causes the formation of undesirable oxygenated products in the reactant streams or in the reaction mixture. In other instances the presence of oxygen has an induction period effect on the reaction itself. More than one of these or other effects can occur at the same time. Oxygen and butadiene readily form peroxides. Thus, for example in butadiene-styrene emulsion polymerization systems the presence of the oxygen in the butadiene leads to the formation of butadiene peroxides and "popcorn" polymers. The butadiene peroxides are in many instances explosive and create a potential hazard in such plants. Popcorn polymers create a nuisance in that they plug various pieces of equipment and necessitate shut-downs for cleaning out said equipment. Even more serious is the effect on the polymerization reaction itself. It has been found that changes in the concentration of oxygen in the butadiene entering into the reactor, in the polymerization of, say, butadiene with styrene changes the rate of polymerization. Thus, it has been found that the rate of polymerization, at least to a material extent, is dependent upon and can be controlled by the concentration of oxygen in the butadiene and styrene undergoing copolymerization. Indeed, it has been found that when the concentration of oxygen in scrubbed butadiene varies from 0 to 10 parts per million, erratic results are noted in respect of product formation. The higher the concentration of oxygen in the butadiene, the slower the rate of polymerization in the polymerizing process. When the concentration of oxygen changes, it is difficult to know when to short-stop the copolymerization reaction to obtain the correct Mooney viscosity latex. Normally, some oxygen enters the butadiene system either during the manufacture of the butadiene itself or during the monomer recovery in the polymerization plant and when the butadiene is returned to the polymerization plant oxygen enters the reactor with the charged butadiene. In those plants which use butadiene received by tank car shipments the oxygen concentration is usually even higher than that in the other plants where the butadiene is manufactured essentially or substantially as used.

We have found that an alkaline aqueous solution of sodium hyposulfite, sometimes called sodium hydrosulfite or sodium dithionite ($Na_2S_2O_4$) having an alkalinity greater than the natural alkalinity imparted to the solution by the sodium hyposulfite can be used to remove substantially all of the oxygen present in a stream of liquid butadiene. We have found that the removal of the oxygen from the butadiene stream results in the production of a much more uniform product from copolymerization reactions.

Thus, according to our invention, there is provided a process for the removal of oxygen from a hydrocarbon stream, for example an olefinic stream, containing the same, e. g., a stream containing butadiene, which comprises subjecting the said stream to the action of an alkaline solution of a alkali metal hyposulfite, said solution having an alkalinity greater than the natural alkalinity imparted to the solution by said alkali metal hyposulfite. In a preferred embodiment of the invention sodium hyposulfite is dissolved in a solution of sodium hydroxide.

Further, according to the invention there is provided a method for the simultaneous removal of oxygen and tertiary-butyl catechol from liquid olefinic streams. The latter substance is sometimes added to said streams as an inhibitor.

It will be noted that the solution used is an alkaline solution having an alkalinity greater than the natural alkalinity imparted to the solution by the alkali metal hyposulfite. In a preferred embodiment of the invention our treating solution consists essentially of an alkaline solution of a quantity of an alkali metal hyposulfite dissolved in a certain quantity of water, said solution having an alkalinity greater than the natural alkalinity of said quantity of said hyposulfite dissolved in said quantity of water.

We are aware that a solution of sodium hyposulfite containing another substance, but not containing sodium hydroxide, has been used for the removal of oxygen and peroxides from various hydrocarbon streams, including butadiene. However, in such process the sodium hyposulfite solution serves as a carrier and activator for the added material which itself actually serves as the oxygen removing ingredient. Without the said added material the rate of oxygen removal is quite slow and contact over a prolonged period of time is necessary if only sodium hyposulfite is present in the solution used to remove dissolved oxygen. Such solutions, containing the various added materials, are alkaline only to the extent of the natural alkalinity imparted to the solution by the sulfite. In some cases the solution containing the added material is made slightly acid in order to speed up the reaction. Prior to our invention it was not believed that solution of sodium hyposulfite, alone, could be used to remove oxygen at a practical commercially feasible rate. Thus, our invention, using an alkaline solution of an alkali-metal hyposulfite, having an alkalinity greater than the natural alkalinity imparted to the solution by said alkali-metal hyposulfite, such as sodium hyposulfite dissolved in a sodium hydroxide solution, represents a distinct advance in the art.

The following examples illustrate the employment of our invention in removing oxygen from liquid butadiene streams comprising several blends of recycled butadiene and new butadiene taken substantially directly from its source of production. Two series of tests were run. In both, the concentration of the aqueous sodium hydroxide solution was 12 percent. In the first series, tabulated in Table I below, sufficient sodium hyposulfite was dissolved in the 12 percent sodium hydroxide solution to make the solution initially 3.3 percent by weight sodium hyposulfite. In the second series of runs, tabulated in Table II below, sufficient sodium hyposulfite was dissolved in the sodium hydroxide solution to make the solution initially 6.5 percent by weight sodium hyposulfite. The various blends of the liquid butadiene containing oxygen were contacted concurrently in a 10-inch pipe, provided with internal baffles for mixing, of approximately 100 gallon capacity, with the alkaline solution of sodium hyposulfite in a once through operation, at an average rate of 2840 gallons of untreated liquid butadiene to the system per 4560 gallons of alkaline sodium hyposulfite solution per hour, in the first series of runs. In the second series of runs the average rate was 2550 gallons of liquid butadiene per 4560 gallons of alkaline sodium hyposulfite per hour. The following Tables I and II show the results obtained.

Table I.—Removal of oxygen from liquid butadiene by use of alkaline solutions of sodium hyposulfite

TEST NO. 1

| Blend No. | Ratio of New Butadiene to Recycle Butadiene | p. p. m. Oxygen in Butadiene | | Residence Time of Butadiene in Scrubber, mins. | Percent $Na_2S_2O_4$ in Treating Solution | No. of Hours Operation |
|---|---|---|---|---|---|---|
| | | Before Scrubbing | After Scrubbing | | | |
| | | | | | 3.3 | 0 |
| 1 | 2.2/1 | 16 | 1 | 1.66 | 2.1 | 14 |
| 2 | 2.1/1 | 7 | 1 | 1.71 | 1.7 | 24 |
| 3 | 2.5/1 | 50 | 1 | 1.53 | 1.4 | 32 |
| 4 | 2.6/1 | 19 | 1 | 1.91 | 0.9 | 47 |
| 5 | 2.6/1 | 20 | 1 | 1.31 | 0.6 | 59 |
| 6 | 3.2/1 | 11 | 1 | 1.73 | 0.4 | 70 |
| 7 | 2.2/1 | 11 | 1 | 1.58 | 0.2 | 87 |
| 8 | 2.2/1 | 27 | 1 | 1.54 | 0.1 | 93 |
| 9 | 1.8/1 | 10 | 1 | 1.53 | 0.0 | 118 |

In the above test the modus operandi was as follows. The blends, 1 to 9, were pumped through the system consecutively. Samples of butadiene were tested periodically to determine the degree of oxygen removal. At the end of 14 hours, during which period blend No. 1 was continuously fed to the system, samples of the butadiene showed that the oxygen therein was being reduced from 16 p. p. m. to 1 p. p. m. A sample of the alkaline sodium hyposulfite solution after 14 hours operation showed that the concentration of the sodium hyposulfite therein had been reduced from 3.3 percent by weight to 2.1 percent by weight. Pumping of blend No. 1 was discontinued after 14 hours and pumping of blend No. 2 to the system was started, etc. The same solution of alkaline sodium hyposulfite was continuously circulated in the system, during treating of blends 1 to 9, and used to exhaustion as shown above.

Tertiary-butyl catechol was omitted from the new butadiene but would have been removed if present.

The same procedure was followed in Test No. 2 wtih blends 10 to 22, the results of which are given below.

Table II

TEST NO. 2

| Blend No. | Ratio of New Butadiene to Recycle Butadiene | p. p. m. Oxygen in Butadiene | | Residence Time of Butadiene in Scrubber, mins. | Percent $Na_2S_2O_4$ in Treating Solution | No. of Hours Operation |
|---|---|---|---|---|---|---|
| | | Before Scrubbing | After Scrubbing | | | |
| | | | | | 6.5 | 0 |
| 10 | 2.7/1 | 15 | 2 | 1.65 | 5.1 | 16 |
| 11 | 5.7/1 | 102 | 2 | 1.75 | 4.7 | 27 |
| 12 | 4.6/1 | 85 | 2 | 1.68 | 4.3 | 36 |
| 13 | 5.6/1 | 47 | 1 | 1.57 | 3.8 | 44 |
| 14 | 5.6/1 | 76 | 1 | 1.86 | 3.1 | 55 |
| 15 | 5.8/1 | 42 | 1 | 1.72 | 2.5 | 66 |
| 16 | 4.3/1 | 83 | 1 | 1.52 | 2.1 | 73 |
| 17 | 5.7/1 | 81 | 1 | 1.65 | 1.6 | 82 |
| 18 | 5.9/1 | 74 | 2 | 1.72 | 1.1 | 92 |
| 19 | 3.2/1 | 73 | 2 | 1.71 | 0.7 | 103 |
| 20 | 3.2/1 | 100 | 2 | 1.59 | 0.3 | 111 |
| 21 | 5.2/1 | 93 | 3 | 1.75 | 0.1 | 121 |
| 22 | 5.3/1 | 90 | 33 | 1.70 | 0.0 | 132 |

The procedure used to determine the amount of oxygen in the liquid butadiene was a modification of the manganous hydroxide method for determining the quantity of oxygen in butadiene vapors. Samples of the liquid butadiene were transferred to 12 ounce crown cap bottles and reacted with sodium hydroxide and manganous chloride. The butadiene was weathered off in an atmosphere of carbon dioxide. Potassium iodide and sulfuric acid were then added and the liberated iodine titrated with standard sodium thiosulfate solution.

Samples of the alkaline sodium hyposulfite from the scrubbing vessels were analyzed for sodium hyposulfite by titrating with a standard solution of indigo. This standard solution of indigo was prepared by dissolving 2.1 grams of indigo in 75 milliliters of concentrated sulfuric acid, heating the solution to 80° C. and maintaining that temperature for one hour, cooling, and diluting to two liters with distilled water. Solutions of known concentration of the sodium hyposulfite in 10 percent caustic solution were prepared, and 50 milliliter portions of the indigo solution were titrated with each of these solutions to a yellow or light green end point. A graph was prepared showing the volume of sodium hyposulfite solution required to reduce 50 milliliters of the standard indigo with various concentrations of the sodium hyposulfite solution. The concentration of the sodium hyposulfite in the solutions from samples from the scrubbing vessels was determined by titrating 50 milliliters of the indigo solution with the sample and referring to the said graph to obtain the concentration. The indigo solution was standardized using a standard potassium permanganate solution.

The concentration of the sodium hydroxide in the treating solutions used in the above series of tests was 12 percent. However, it should be realized that other concentrations of sodium hydroxide can be used. We prefer to use a solution of sodium hydroxide containing from 10 to 15 percent sodium hydroxide. However, a sodium hydroxide solution ranging from 5 to 25 percent can be used. However, concentrations outside these ranges are operative.

Any concentration of sodium hyposulfite in an aqueous sodium hydroxide solution ranging from 0.1 percent by weight up to 15.0 percent by weight is operative. However, concentrations outside this range of sodium hyposulfite concentration can be employed. Presently a concentration of 1.0 to 10.0 percent by weight is believed to be most advantageous.

The invention has been described in connection with the removal of oxygen from liquid butadiene. It should be understood, however, that the invention can be employed to remove oxygen from other liquid hydrocarbon streams such as gasoline and naphthas, and particularly from other olefin-containing streams. Likewise, while the invention has been described in connection with polymerization processes, it should be understood that the invention can be employed for the removal of oxygen from streams used in other processes, e. g., hydrogenation, alkylation, isomerization, etc., if it is desired to remove oxygen from such streams.

By the practice of this invention peroxides, if present, are also removed from the liquid butadiene. As mentioned above, these peroxides lead to the formation of undesirable polymers in the butadiene system. During the above-described series of tests which extended over a considerable period of time the freedom of the butadiene system, following the treatment according to this invention, from butadiene peroxides and polymers was noted. This freedom from these undesirable materials was particularly noticeable in the reactor surge tank which immediately followed the treating vessels. Previously this tank had to be opened, steamed and inspected periodically. In many instances explosive butadiene peroxides have been found in the past.

The practice of our invention is not dependent upon the method of contacting employed. Any conventional method for contacting two fluids can be employed. For example, the stream to be treated can be treated in a conventional agitator containing the treating solution and equipped with spray nozzles through which the material to be treated is sprayed. Another method which can be employed is to simultaneously pass the streams to be contacted through a centrifugal pump, or other mixing device, and then into a settler where a phase separation is effected. Still another method which can be employed is to contact the stream to be treated and the treating solution countercurrently in a packed or bubble-cap tower as described above.

The invention is preferably carried out at normal atmospheric temperatures. However, any temperatures at which the reaction proceeds can be employed.

Pressures employed preferably should be sufficient to maintain the stream to be treated in substantially liquid phase although it is noted that gaseous-liquid contact can be employed.

The invention has been described as employing aqueous solutions. However, it should be understood that solvents other than water can be employed. Any solvent possessing sufficeint solvent capacity for the chemicals used, which is unreactive with the hydrocarbon stream being treated, and in which the alkali-metal hydroxide will ionize to supply alkalinity can be employed.

Reasonable variation and modification are possible within the scope of the foregoing disclosure and the appended claims to the invention, the essence of which is that oxygen and/or peroxide can be removed from hydrocarbon streams, such as butadiene, by subjecting the same to contact with an alkaline solution of an alkali-metal hyposulfite, said solution having an alkalinity greater than the natural alkalinity imparted to the solution by said alkali-metal hyposulfite.

We claim:

1. A process for the removal of oxygen from butadiene which comprises treating the said butadiene with a solution of sodium hydroxide containing dissolved sodium hyposulfite.

2. A process for the removal of oxygen from a stream of hydrocarbons consisting essentially of hydrocarbons containing at least 1 but not more than 2 ethylenic carbon-to-carbon double bonds which comprises treating said stream with a sodium hydroxide solution containing at least five percent sodium hydroxide and at least 0.1 percent sodium hyposulfite.

3. The simultaneous removal of tertiary-butyl catechol and oxygen from a hydrocarbon stream containing both, said hydrocarbon stream consisting essentially of hydrocarbons containing at least 1 but not more than 2 ethylenic carbon-to-carbon double bonds, which comprises treating said stream with a sodium hydroxide solution containing at least 5 percent sodium hydroxide and at least 0.1 percent sodium hyposulfite.

4. A process for the removal of oxygen and peroxides from butadiene which comprises treating the said butadiene with an aqueous solution of sodium hydroxide containing dissolved sodium hyposulfite.

5. A method for reducing the oxygen content of a hydrocarbon stream consisting essentially of hydrocarbons containing at least 1 but not more than 2 ethylenic carbon-to-carbon double bonds to less than five parts per million which comprises contacting said stream for a period of time less than two minutes with an aqueous solution containing from 5 to 25 percent by weight of sodium hydroxide and from 0.1 to 15 percent of sodium hyposulfite; the volume ratio of said stream to said solution during said contacting being within the range of 0.5:1 to 0.7:1.

6. A method according to claim 5 wherein said hydrocarbon stream consists essentially of butadiene.

7. The process of claim 5 wherein said contacting time is within the range of about 1.3 minutes to about 1.9 minutes.

8. In a process in which a diolefin is subjected to polymerization conditions to form a high molecular weight polymer and wherein the presence of oxygen in said diolefin is detrimental to said polymerization, the step of contacting said diolefin for a period of time less than two minutes with an aqueous solution containing from 5 to 25 percent by weight of sodium hydroxide and from 0.1 to 15 percent of sodium hyposulfite.

9. A process according to claim 8 wherein said diolefin is butadiene.

10. In a process for the copolymerization of butadiene and styrene wherein the presence of oxygen in said butadiene is detrimental to said copolymerization the improvement which comprises contacting said butadiene for a period of time less than two minutes with an aqueous solution containing from 5 to 25 percent by weight of sodium hydroxide and from 0.1 to 15 percent of sodium hyposulfite; and thereby removing said oxygen.

11. The process of claim 10 wherein said contacting time is within the range of about 1.3 minutes to about 1.9 minutes.

12. A method for the simultaneous removal of tertiary-butyl catechol and oxygen from a hydrocarbon stream containing both, said hydrocarbon stream consisting essentially of hydrocarbons containing at least 1 but not more than 2 ethylenic carbon-to-carbon double bonds which comprises contacting said stream for a period of time less than two minutes with an aqueous solution containing from 5 to 25 percent by weight of sodium hydroxide and from 0.1 to 15 percent of sodium hyposulfite; the volume ratio of said essentially olefinic stream to said solution during said contacting being within the range of 0.5:1 to 0.7:1.

13. A method according to claim 12 wherein said hydrocarbon stream consists essentially of butadiene.

14. A process for the removal of oxygen from a stream of hydrocarbons consisting essentially of hydrocarbons containing at least 1 but not more than 2 ethylenic carbon-to-carbon double bonds which process comprises: treating said stream with an agent consisting essentially of an aqueous alkaline solution of an alkali metal hyposulfite, said solution having an alkalinity greater than the natural alkalinity of an aqueous solution of said alkali metal hyposulfite.

15. In a process for the polymerization of a diolefin to produce a rubber like material, wherein the presence of oxygen in said diolefin is detrimental to said polymerization, and wherein it is desired to obtain a uniform product with regularity, the improvement which comprises: treating said diolefin to remove oxygen therefrom by passing said diolefin into contact with an aqueous alkaline solution having a concentration of an alkali-metal hyposulfite in the range of 0.1 to 15 percent by weight and a concentration of alkali-metal hydroxide in the range of 5 to 25 percent by weight.

16. The method of claim 15 wherein said alkali-metal hyposulfite is selected from the group consisting of sodium hyposulfite and potassium hyposulfite, and said alkali-metal hydroxide is selected from the group consisting of sodium hydroxide, potassium hydroxide, lithium hydroxide, rubidium hydroxide and caesium hydroxide.

17. In a process for the controlled emulsion polymerization of butadiene with styrene to produce a rubber like material, wherein the presence of oxygen in said butadiene is detrimental to said polymerization, and wherein it is desired to obtain a uniform product with regularity, the step of pretreating the butadiene fed to the said polymerization process with an aqueous solution of caustic soda containing 0.1 to 15 percent by weight of an alkali-metal hyposulfite, the said caustic soda solution containing from 5 to 25 percent by weight of sodium hydroxide.

18. The method of claim 17 wherein said alkali-metal hyposulfite is selected from the group consisting of sodium hyposulfite, and potassium hyposulfite.

19. In a polymerization process for the production of a rubber like material by the polymerization of a diolefin to which tertiary butyl catechol has been added as a stabilizer therefor, wherein the presence of oxygen in said diolefin is detrimental to said polymerization, and wherein it is desired to obtain a uniform product with regularity, the improvement which comprises: treating said diolefin to simultaneously remove said tertiary-butyl catechol and said oxygen therefrom by passing said diolefin into contact with an aqueous alkaline solution containing from 0.1 to 15 percent by weight of an alkali-metal hyposulfite and from 5 to 25 percent by weight of an alkali-metal hydroxide.

20. A process for the removal of oxygen and peroxides from a stream of hydrocarbons consisting essentially of hydrocarbons containing at least 1 but not more than 2 ethylenic carbon-to-carbon double bonds, which process comprises: treating said stream with an agent consisting essentially of an aqueous alkaline solution of an alkali metal hyposulfite, said solution having an alkalinity greater than the natural alkalinity of an aqueous solution of said hyposulfite.

References Cited in the file of this patent

UNITED STATES PATENTS 2,565,354    Cohen ---------------- Aug. 21, 1951